F. LIEDTKE.
THERMOMETER CARRIER.
APPLICATION FILED DEC. 4, 1912.
1,102,062.
Patented June 30, 1914.
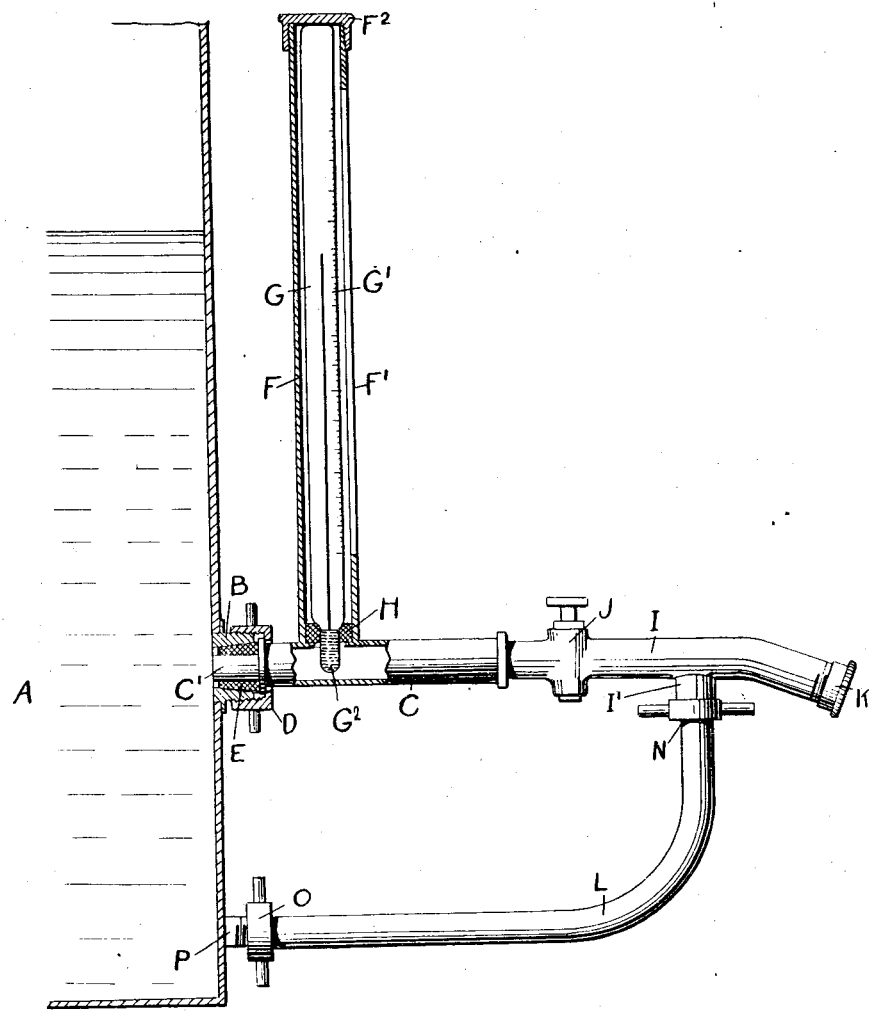
WITNESSES
INVENTOR
Franz Liedtke,
BY
ATTORNEYS

UNITED STATES PATENT OFFICE.

FRANZ LIEDTKE, OF ALSLEBEN-ON-THE-SAALE, GERMANY.

THERMOMETER-CARRIER.

1,102,062.   Specification of Letters Patent.   Patented June 30, 1914.

Application filed December 4, 1912. Serial No. 734,859.

*To all whom it may concern:*

Be it known that I, FRANZ LIEDTKE, a subject of the German Emperor, and a resident of Alsleben-on-the-Saale, Germany, have invented a new and Improved Thermometer-Carrier, of which the following is a full, clear, and exact description.

The object of the invention is to provide a new and improved thermometer carrier more especially designed for use on milk-heating vessels and other similar apparatus, and arranged to dispense with the use of specially constructed angular thermometers, to allow the use of an ordinary thermometer to test the same, and to permit of withdrawing samples of the liquid from the vessel to which the thermometer carrier is attached.

In order to produce the desired result use is made of an external circulating pipe connected at its ends with a heating vessel at different levels, and a thermometer held on the said circulating pipe and extending with its bulb into the liquid circulating through the pipe.

A practical embodiment of the invention is represented in the accompanying drawings forming a part of this specification, in which the figure is a sectional side elevation of the thermometer carrier as applied to a milk-heating vessel.

To one side of the vessel A containing milk or other liquid to be heated or sterilized is secured a nipple B in which is fastened the end C' of a pipe C by the use of a coupling D screwing on the nipple B. A packing E surrounds the end C' and fits into the nipple B to prevent leakage of the liquid at the coupling D and the nipple B. From the pipe C extends an angular pipe or casing F in which is arranged an ordinary thermometer G, the graduation G' of which is visible through a slot F' in the casing F, and the bulb G² of the thermometer G extends into the pipe C, so that the liquid passing from the vessel A into and through the pipe C comes in contact with the bulb G². The lower end of the thermometer G is seated on a rubber or leather cushion H held in the bottom of the extension F, and the upper end of the thermometer G is engaged by a cap F² screwing on the top of the casing F so as to press the thermometer G downward and firmly in contact with the cushion H to prevent leakage of the liquid into the casing F and to properly extend the bulb G² of the thermometer into the pipe C. To the outer end of the pipe C is coupled or otherwise secured an extension pipe I provided with a valve J and adapted to be engaged by a cap K. The return pipe L is connected by a coupling N with a nipple I' extending from the pipe I, and the return pipe L is also connected by a coupling O with a nipple P attached to the vessel A, preferably at a point a distance below the nipple B, so that the nipples B and P are located at different levels. When the valve J is opened the liquid from the vessel A flows through the pipe C into the pipe I and by the return pipe L and nipple P back into the vessel A, so that the liquid during its circulation comes in contact with the bulb G² to indicate the temperature of the liquid on the thermometer G. When it is desired to take a sample of the liquid contained in the vessel A it is only necessary to unscrew the cap K and allow some of the liquid to flow into a glass or other receptacle. When it is desired to test the accuracy of the thermometer G a standard thermometer may be applied to the end of the pipe I at the time the cap K is removed therefrom.

It will be noticed that by the arrangement described an ordinary thermometer may be used, and the thermometer is properly protected and is hence not liable to be broken or otherwise injured and the temperature of the liquid is accurately indicated by the thermometer.

Having thus described my invention, I claim as new and desire to secure by Letters Patent:

1. A thermometer carrier for heating vessels, comprising an outlet pipe attached to the vessel and having an angular extension provided with a cushioned seat, a thermometer seated on the said seat and having its bulb extending into the said pipe, and a cap on the outer end of the said extension and engaging the outer end of the thermometer to press the latter against the said seat.

2. A thermometer carrier for heating vessels, comprising a main outlet pipe adapted to be attached to the vessel and provided with an angular extension, a thermometer held in the said extension and having its bulb extending into the said pipe, a valved pipe attached to the outer end of the said main pipe, and a return connection between the said valved pipe and the vessel.

3. A thermometer carrier for heating vessels, comprising a main outlet pipe adapted to be attached to the vessel and provided with an angular extension, a thermometer held in the said extension and having its bulb extending into the said pipe, a valved pipe attached to the outer end of the said main pipe, a removable cap for the outer end of the said valved pipe, and a return connection between the said valved pipe and the vessel.

In testimony whereof I have signed my name to this specification in the presence of two subscribing witnesses.

FRANZ LIEDTKE.

Witnesses:
JAKOB MÜLLER,
WALTHER HAUSHAHN.